United States Patent
Jain et al.

(10) Patent No.: US 10,075,345 B2
(45) Date of Patent: Sep. 11, 2018

(54) CLOUD BASED MANUAL DISCOVERY OF DEVICES IN A DEVICE MANAGEMENT ENVIRONMENT

(71) Applicant: Wyse Technology L.L.C., Santa Clara, CA (US)

(72) Inventors: Shailesh Jain, Bangalore (IN); Prashanth Devendrappa, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 289 days.

(21) Appl. No.: 15/091,889

(22) Filed: Apr. 6, 2016

(65) Prior Publication Data

US 2017/0295065 A1    Oct. 12, 2017

(51) Int. Cl.
G06F 13/00 (2006.01)
H04L 12/24 (2006.01)
H04L 29/08 (2006.01)

(52) U.S. Cl.
CPC ............ *H04L 41/12* (2013.01); *H04L 41/046* (2013.01); *H04L 41/0886* (2013.01); *H04L 67/10* (2013.01)

(58) Field of Classification Search
CPC ... H04L 41/12; H04L 41/0886; H04L 41/046; H04L 67/10
USPC ................................. 709/223, 224, 203, 245
See application file for complete search history.

(56) References Cited

U.S. PATENT DOCUMENTS

| | | | |
|---|---|---|---|
| 7,478,130 B2 * | 1/2009 | Aoki ...................... | G06F 9/542 709/206 |
| 8,385,551 B2 * | 2/2013 | Pourzandi ............... | G06F 21/53 380/277 |
| 9,124,843 B2 * | 9/2015 | Kato ........................ | H04N 1/44 |
| 9,935,867 B2 * | 4/2018 | Jain ..................... | H04L 41/0631 |
| 2004/0202165 A1* | 10/2004 | Aoki ....................... | G06F 9/542 370/392 |
| 2008/0152151 A1* | 6/2008 | Pourzandi ............... | G06F 21/53 380/286 |
| 2010/0122084 A1* | 5/2010 | Liu ....................... | H04L 9/0833 713/163 |
| 2014/0104638 A1* | 4/2014 | Kato ....................... | H04N 1/44 358/1.14 |

* cited by examiner

*Primary Examiner* — Kenneth R Coulter
(74) *Attorney, Agent, or Firm* — Kirton McConkie; Brian Tucker (57) ABSTRACT

Manual discovery of devices in a device management environment can be performed from a management server. The manual discovery process can enable the discovery process to be initiated at the management server and can be performed without requiring an administrator or other user to manually configure each device to initiate and perform the discovery process. To discover devices to be managed, the management server, which can be a cloud based server or Software as a Service based server, can send a registration request to an on-premise server. The on-premise server can then relay this registration request to all devices on the same network infrastructure. The agent on each device can be configured to listen for such registration requests, and in response to receiving a registration request, can automatically register with the management server using information contained in the registration request. In this way, the management server can manually discover devices.

20 Claims, 9 Drawing Sheets

CLOUD BASED MANUAL DISCOVERY OF DEVICES IN A DEVICE MANAGEMENT ENVIRONMENT

CROSS-REFERENCE TO RELATED APPLICATIONS

N/A

BACKGROUND

A number of different device management platforms exist including, for example, Dell's Cloud Client Manager. These device management platforms can allow a number of different types of devices, including, for example, thin clients, zero clients, tablets, and smartphones, to be monitored and managed from a single location (i.e., from the cloud). To allow this monitoring and management, a device agent is installed on each device so that the management server can communicate with the device agent to implement a desired type of monitoring or management. Such devices will hereafter be referred to as "managed devices."

For a device to be managed by the management server, the device must first be known to the management server. The process by which a management server becomes aware of a device is referred to as discovery. Currently, this discovery process can be performed in a number of different ways. However, regardless of how it is performed, discovery is initiated from the client by configuring the client to register with and report to the management server. In an environment that includes a large number of devices to be managed, this discovery process can be very tedious and burdensome as it would require an administrator to manually configure each device to communicate properly with the management server. Alternatively, the individual users could be relied on to perform the configuration process themselves on their devices. However, this may result in additional difficulties since many users may not properly configure their device or may even be unwilling to attempt to configure their device.

BRIEF SUMMARY

The present invention extends to methods, systems, and computer program products for performing manual discovery of devices in a device management environment. The manual discovery process of the present invention can enable the discovery process to be initiated at the management server and can be performed without requiring an administrator or other user to manually configure each device to initiate and perform the discovery process.

To discover devices to be managed, the management server, which can be a cloud based server or Software as a Service based server, can send a registration request to an on-premise server. The on-premise server can then relay this registration request to all devices on the same network infrastructure (e.g., in the same subnet). The agent on each device can be configured to listen for such registration requests, and in response to receiving a registration request, can automatically register with the management server using information contained in the registration request. In this way, the management server can manually discover devices.

In some cases, a registration request can also provide information about a notification server that the management server employs to send out notices to managed devices. In these cases, the agent on each device can also be configured to automatically register with the notification server using information that was supplied in a registration request.

Because the management server can be a cloud based server, it may be employed by a number of different tenants to manage their devices. Each on-premise server can therefore be registered with a particular tenant. Then, when a particular tenant desires to manually discover its devices, it can request that the management server send registration requests to each on-premise server associated with that particular tenant. In this way, a tenant can easily discover and manage its devices.

In one embodiment, the present invention is implemented as a method for manually discovering managed devices from a management server. A management server can send a registration request to an on-premise server. The registration request includes a management server URL that the management server employs to receive registration communications from managed devices and a group token. In response to receiving the registration request, the on-premise server sends a registration packet to a device agent on each managed device connected to a local network to which the on-premise server is also connected. The registration packet includes the management server URL and the group token. In response to receiving the registration packet, the device agent on each managed device sends a registration communication to the management server at the management server URL. The registration communication includes the group token and device information.

In another embodiment, the present invention is implemented as a device management platform that includes a management server that executes in the cloud, an on-premise server that is connected to a local network, and a device agent configured to be installed on devices that are connected to the local network. The management server is configured to send a registration request to the on-premise server. The registration request includes a management server URL that the management server employs to receive registration communications from managed devices and a group token. In response to receiving the registration request, the on-premise server is configured to send a registration packet to the device agent on each managed device connected to the local network. The registration packet includes the management server URL and the group token. In response to receiving the registration packet, the device agent is configured to send a registration communication to the management server at the management server URL. The registration communication includes the group token and device information.

In another embodiment, the present invention is implemented as computer storage media storing computer executable instructions which when executed by one or more processors implement a method for manually discovering managed devices from a management server. The method includes: sending, by a management server, a registration request to an on-premise server, the registration request including a management server URL that the management server employs to receive registration communications from managed devices, a group token, and a notification server URL that a notification server employs to receive registration communications from managed devices; in response to receiving the registration request, sending, by the on-premise server, a registration packet to a device agent on each managed device connected to a network to which the on-premise server is also connected, the registration packet including the management server URL, the group token, and the notification server URL; and in response to receiving the registration packet, sending, by the device agent on each managed device, a registration communication to the management server at the management server URL, the registration communication including the group token and device information.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a managed device should be construed as any type of computing device that includes a device agent of a device management platform. Managed devices may typically be thin clients or mobile devices. However, a desktop or laptop computer may also be a managed device.

Figure 1:
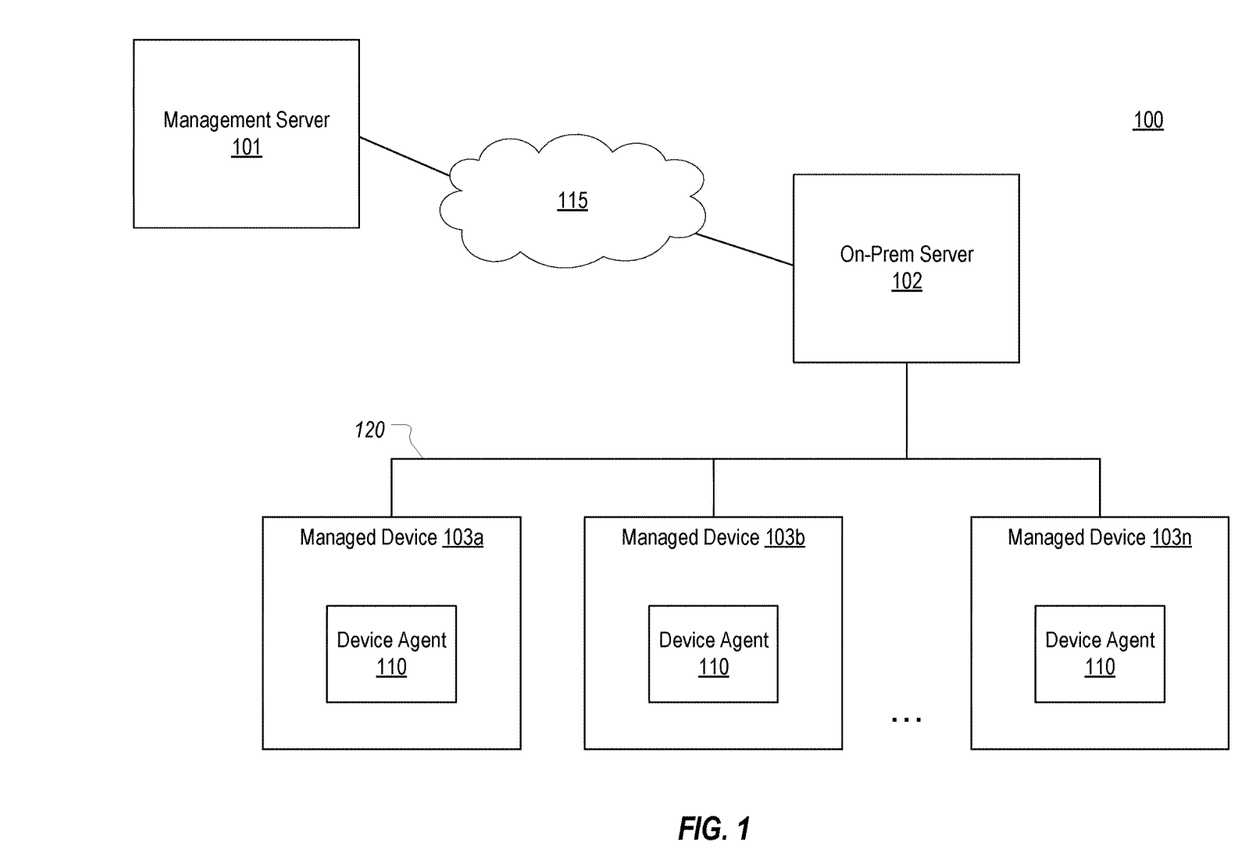
FIG. 1 illustrates an example computing environment in which the present invention can be implemented.

FIG. 1 illustrates an example computing environment 100 in which the present invention can be implemented. Computing environment 100 includes a management server 101, an on-premise server 102, and a number of managed devices 103a-103n (where n represents any number) (or collectively managed devices 103). As its name implies, on-premise server 102 will typically be located in the same geographic location as managed devices 103a-103n. More specifically, on-premise server 102 can be a server that is in the same local network 120 as managed devices 103a-103n (i.e., on-premise server 102 and managed devices 103a-103n can be connected to the same intranet). For example, on-premise server 102 and managed devices 103a-103n can all be part of the same subnet. In contrast, management server 101 can be hosted in a public cloud and therefore function as Software as a Service. Therefore, on-premise server 102, as well as managed devices 103a-103n, can communicate with management server 101 via the internet 115.

Each of managed devices 103a-103n can include a device agent 110. Device agent 110 can comprise software that is configured to receive communications from management server 101 pertaining to management of the devices. Accordingly, to cause a device to become a managed device, device agent 110 can be installed on the device. However, as indicated in the background, for the device to be managed by management server 101, the device must first be discovered by (or registered with) management server 101. The present invention allows this discovery process to be initiated by management server 101 for the purpose of discovering all managed devices that are connected to the same subnet as opposed to requiring each device to individually register itself with management server 101.

Figure 2:
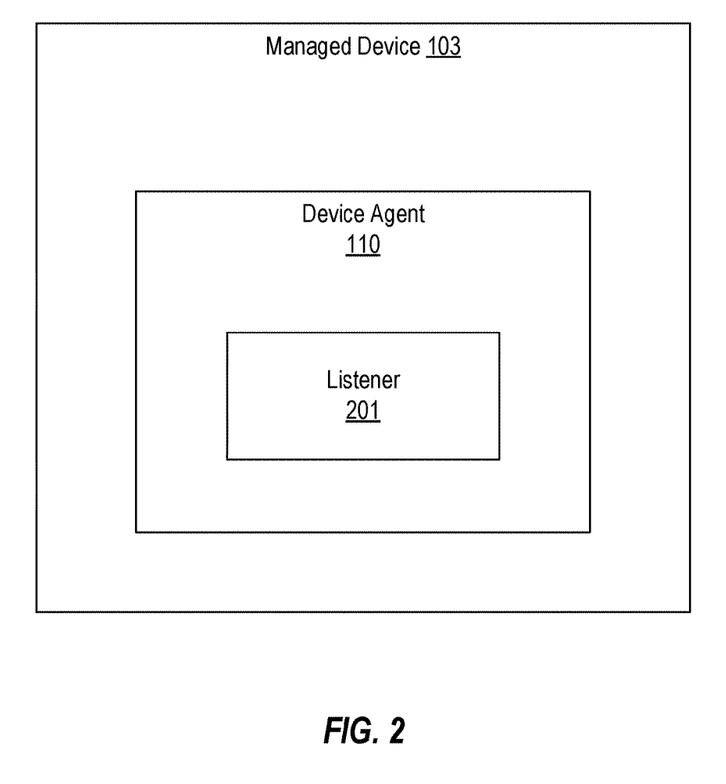
FIG. 2 illustrates an example architecture of a device agent that can be installed on a managed device to enable the device to be discovered by a management server.

FIG. 2 illustrates an example architecture of device agent 110 that can be employed to enable managed devices 103 to be manually discovered by management server 101. As shown, each device agent 110 can include a listener 201 that is configured to listen for registration requests that are broadcast on the subnet to which the managed devices 103 are connected. For example, listener 201 can be configured to listen on a particular IP address/port used by on-premise server 102 for multicasting or broadcasting (hereinafter broadcasting) registration requests. Listener 201 can also be configured to notify device agent 110 (or more specifically, the appropriate components of device agent 110) when a registration request is received so that device agent 110 can automatically register with management server 101.

Figure 3A:
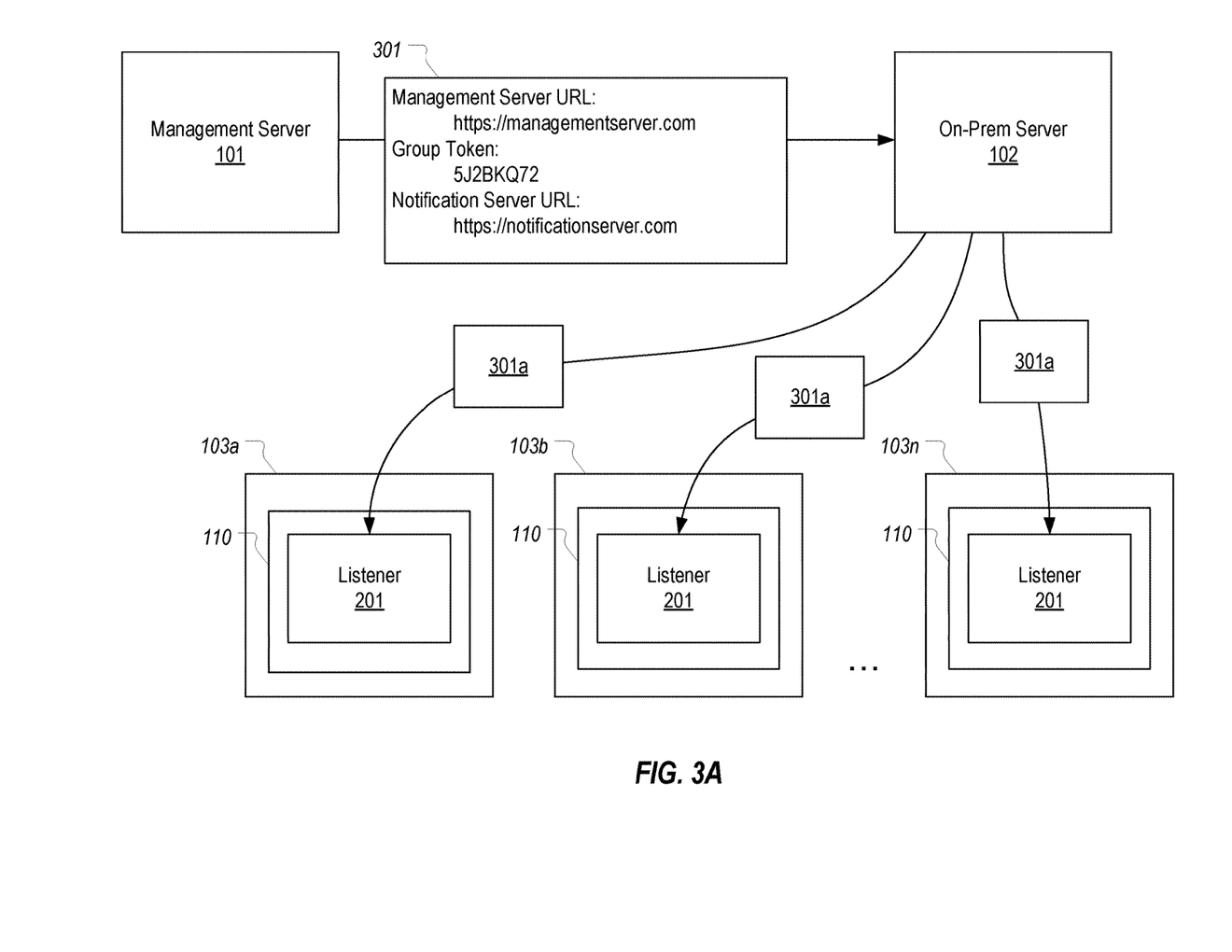
FIGS. 3A-3E illustrate how a management server can perform manual discovery of managed devices via an on-premise server.

FIGS. 3A-3E generally illustrate this manual discovery process. In FIG. 3A, management server 101 is shown as sending a registration request 301 to on-premise server 102. As indicated above, management server 101 can be a cloud based server that is employed by a number of different tenants (or entities) to manage their devices. In other words, management server 101 can function as Software as a Service. On-premise server 102 can be a local server that is connected to the same local network as managed devices 103a-103n. This will allow on-premise server 102 to broadcast a registration request 103a to the device agent 110 on each device 103a-103n connected to local network 120 (e.g., each device that has a device agent 110 installed and that is part of the same subnet as on-premise server 102).

As will be further described below, management server 101 can send registration request 301 in response to input from an administrator requesting discovery of managed devices. Alternatively, management server 101 can be configured to automatically send a registration request 301 at a certain time or in accordance with a specified recurring schedule (e.g., every morning at 10:00 AM).

As shown in FIG. 2, registration request 301 can specify a management server URL (e.g., https://managementserver.com), a group token (e.g., 5J2BKQ72), and, in some embodiments, a notification server URL (e.g., https://notificationserver.com) among possibly other types of information. On-premise server 102 can be configured to receive registration request 301 in any suitable manner such as, for example, via HTTPS. The management server URL can be the URL employed by management server 101 to receive registration requests from managed devices (e.g., a URL that resolves to an IP address/port where a device registration service of management server 101 listens for registration communications).

The group token can be a unique identifier of a group to which the managed devices should be registered. An administrator can access management server 101 to define one or more groups and to identify which devices should belong to each group. For example, an administrator may define a group that encompasses all of the entity's managed devices, all devices of a particular type, all devices of users within a particular division, etc. For purposes of the present discussion, it will be assumed that registration request 301 includes a group token identifying a group to which all devices connected to local network 120 pertain. However, it is possible that a group token may pertain to only a subset of the devices connected to local network 120. In such cases, registration request 301 may include additional information defining the type of devices to which the request pertains (e.g., only to iOS devices or only to thin client devices of a particular type or associated with a particular group of users).

In some embodiments, management server 101 may employ a separate notification server to send out notifications to managed devices. In such cases, registration request 301 can include the notification server's URL (e.g., a URL that resolves to an IP address/port where the notification server listens for registration communications).

When on-premise server 102 receives registration request 301, it can generate an appropriate registration packet 301a containing the information of registration request 301 (e.g., the management server URL, group token, and the notification server URL) and broadcast registration packet 301a on local network 120. Because each device agent 110 includes listener 201 that is actively listening for broadcast requests from on-premise server 102, the device agent on each managed device connected to local network 120 will receive registration packet 301a.

Figure 3B:
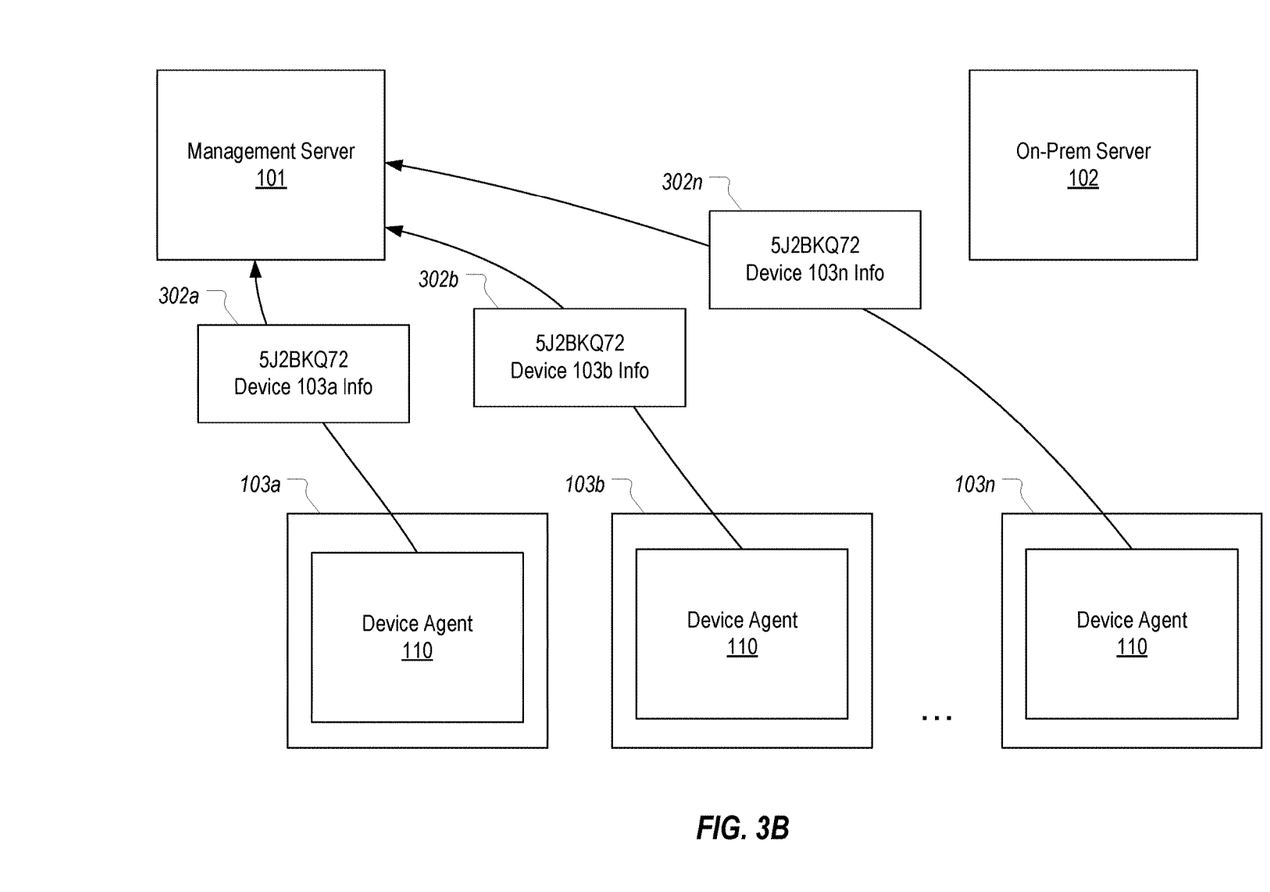

In response to receiving registration packet 301a, device agent 110 can be configured to automatically register the managed device with management server 101 which is represented in FIG. 3B. As shown, device agent 110 on each of managed devices 103a-103n sends a registration communication 302a-302n respectively to management server 101 using the management server URL that was included in registration packet 301a. Registration communications 302a-302n can therefore be sent as HTTP requests in some embodiments. Each of registration communications 302a-302n can include the group token that was provided in registration packet 301a as well as device information specific to the sending device. For example, this device information can include the device's name, MAC address, and time zone among possible other types of information.

In some embodiments, such as when registration request 301 specifies a subset of managed devices to which it pertains, registration packet 301a can include information defining this subset (e.g., information identifying a type of thin client to which the registration request pertains). In such cases, device agent 110 can be configured to determine whether the registration request pertains to its device and only send the registration communication when registration request pertains to the device. This can allow management server 101 to only discover a subset of devices that are connected to the same local network as a particular on-premise server. For example, an administrator may only desire to discover managed mobile devices. In such cases, registration request 301 and therefore registration packet 301a can identify mobile devices to allow device agent 110 on each managed device to determine whether it should send a registration communication to management server 101.

In response to receiving each of registration communications 302a-302n and upon verifying that the group token included in each registration communication is valid, management server 101 can register each managed device. It is noted that, to this point, no input has been required to any of managed devices 103a-103n. As long as managed devices 103a-103n are connected to local network 120 when registration packet 301 is broadcast, the submission of registration communications 302a-302n will occur automatically without end-user input.

Figure 3C:
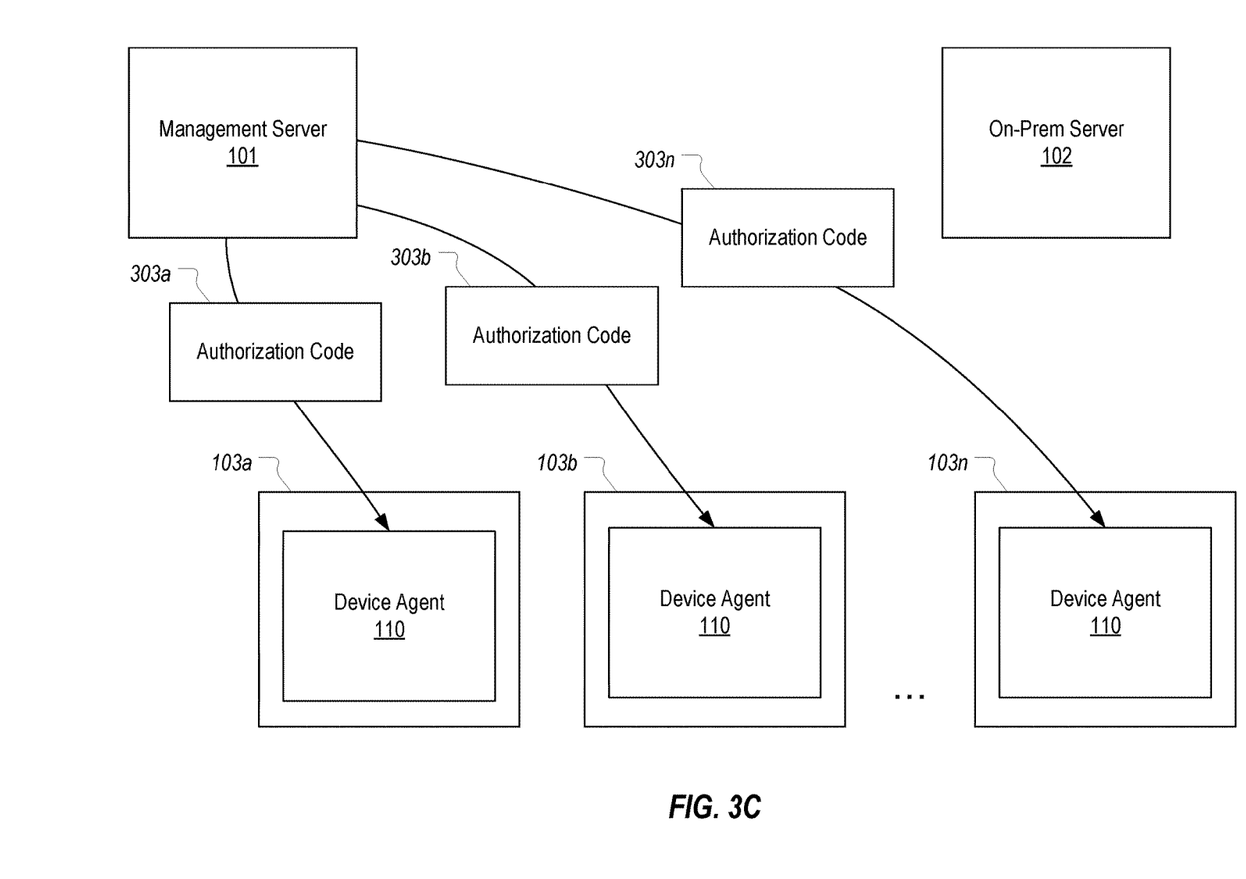
Figure 3D:
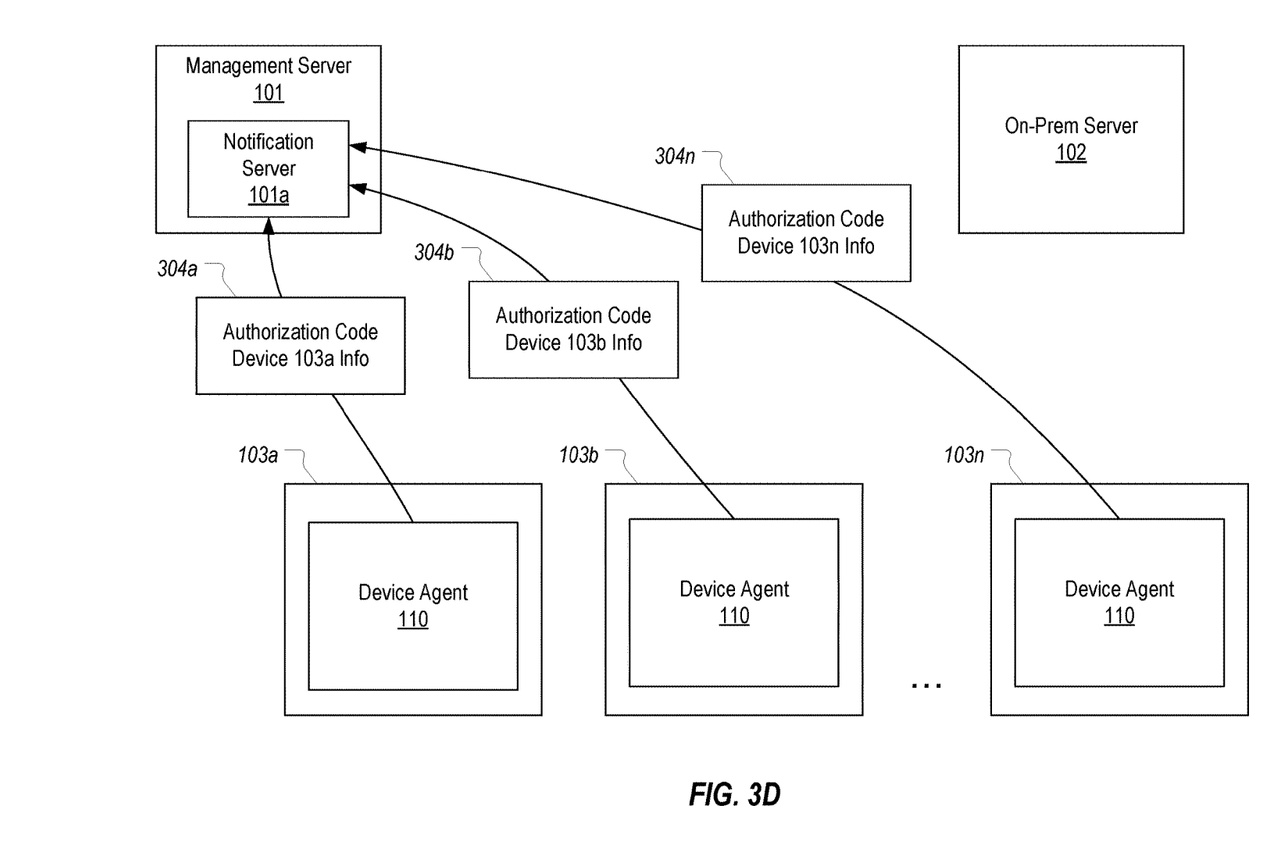

In some embodiments, as part of registering each managed device 103a-103n, management server 101 can send an authorization code 303a-303n to device agent 110 on each managed device 103a-103n that has been registered as is shown in FIG. 3C. Device agent 110 can employ this authorization code to subsequently register with notification server 101a as is shown in FIG. 3D. In particular, device agent 110 on each of managed devices 103a-103n can send a registration communication 304a-304n respectively to the notification URL which was specified in registration packet 301a. In some embodiments, these registration communications 304a-304n may also include device information. Notification server 101a can employ the authorization code to verify that the sending device is authorized to receive notifications pertaining to the corresponding group and can employ the device information when sending out subsequent notifications.

As a result of this process, each managed device 103a-103n will be registered with management server 101 as well as with notification server 101a without requiring any end user involvement. The registration process can be completely driven from management server 101 thereby relieving administrators and/or end users from needing to manually configure each managed device to perform the registration process.

Figure 3E:
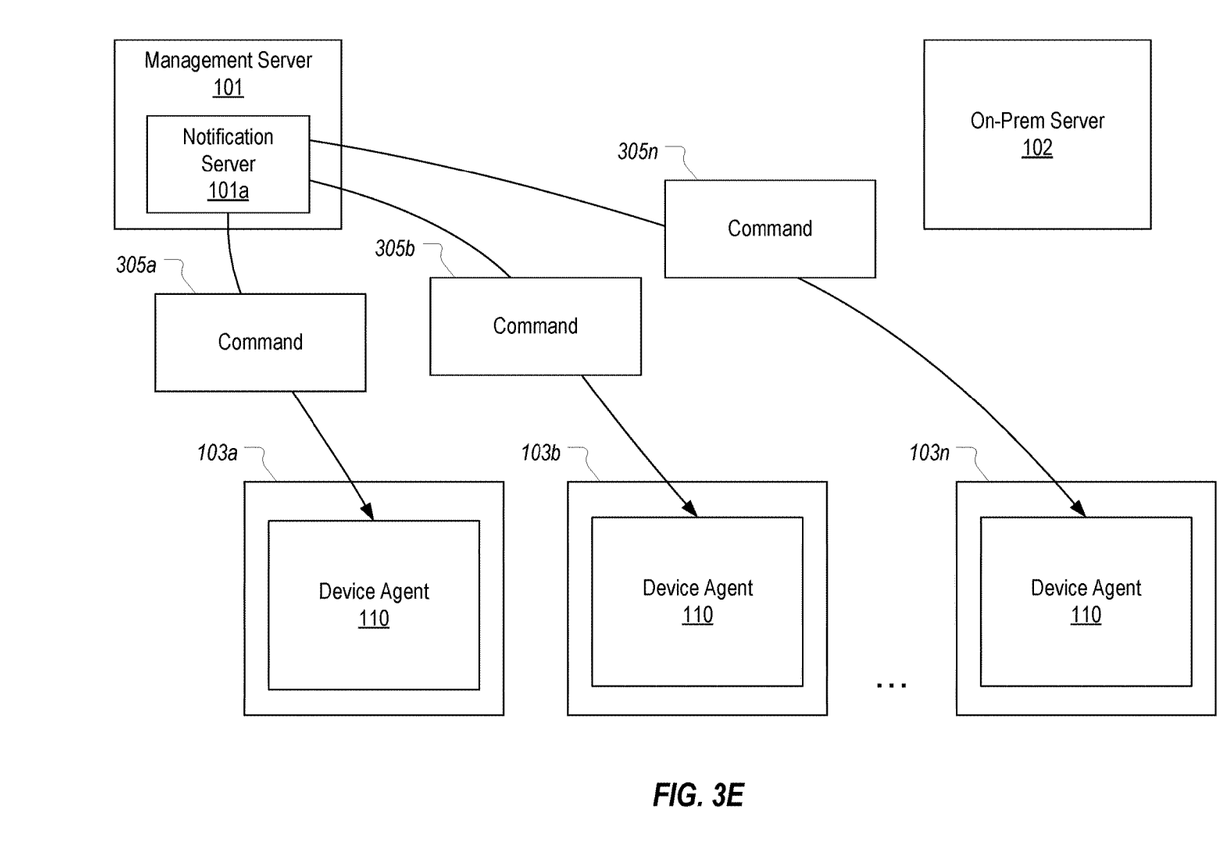

With each managed device 103a-103n registered, management server 101 can be employed to manage the devices. FIG. 3E illustrates an example of how this management process can be performed. Although not shown, because managed devices 103a-103n are registered with management server 101, an administrator can login to management server 101 and view information about managed devices 103a-103n and possibly instruct management server 101 to send a particular command to these managed devices. In embodiments that employ a separate notification server, management server 101 can instruct notification server 101a to send the particular command to each managed device in a particular group. Due to the registration process, notification server 101a will have generated a list of each managed device within the particular group including the necessary information for communicating with the device agent on the managed devices. Accordingly, FIG. 3E shows that notification server 101a can send commands 305a-305n to the device agents on managed devices 103a-103n respectively.

Figure 4:
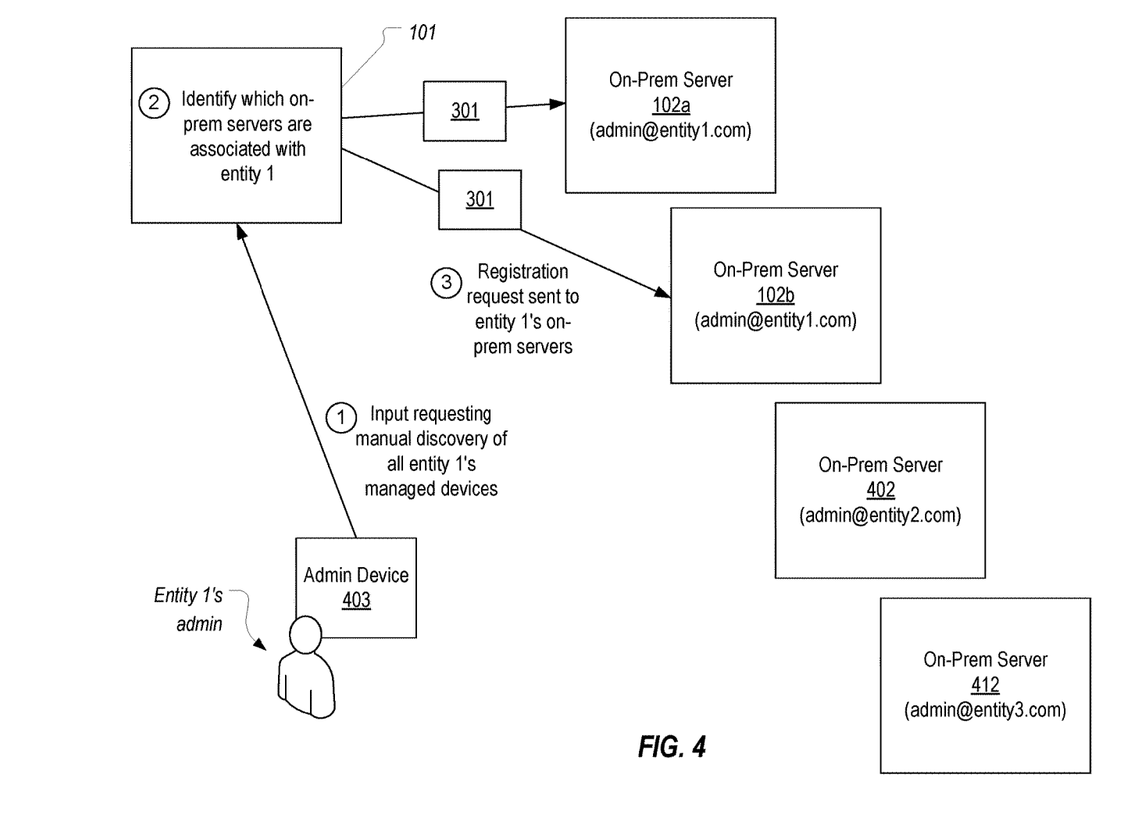
FIG. 4 illustrates how a management server can allow an administrator to initiate the manual discovery process of his or her entity's managed devices.

As indicated above, management server 101 can be implemented as Software as a Service in the cloud and can therefore be accessible to a large number of different entities (or tenants) to allow these entities to manage their devices. Because of this, management server 101 can implement mechanisms to ensure that registration requests are only sent to managed devices pertaining to a particular entity. FIG. 4 illustrates an example of how this can be performed.

In FIG. 4, management server 101 is shown along with four on-premise servers 102a, 102b, 402, and 412. On-premise servers 102a and 102b represent entity 1's local servers. For example, if entity 1 has two geographically separated offices, on-premise servers 102a and 102b can represent the servers connected to the local area networks at the two locations. On the other hand, on-premise server 402 can represent entity 2's local server while on-premise server 412 can represent entity 3's on-premise server. It is noted that, in actual implementations, there may be thousands of tenants that employ management server 101 and therefore thousands of different on-premise servers that are registered with management server 101.

As illustrated in FIG. 4, each on-premise server is registered with a particular account. For example, on-premise server 102a and 102b can be associated with an account having a username of admin@entity1.com (i.e., entity 1's administrator's email address). On-premise servers 402 and 412 are similarly associated with an account having a username of each entity's administrator's email address.

FIG. 4 also shows that entity 1's administrator is employing an administrator device 403 (which can be any device with internet connectivity) to communicate with management server 101.

Upon logging in, entity 1's administrator will be provided with information about all of entity 1's managed devices that are currently registered with management server 101. While logged in, entity 1's administrator may provide input requesting the manual discovery of all of entity 1's managed devices as represented in step 1 in FIG. 1.

In response, management server 101 can commence the process depicted in FIGS. 3A-3D. However, as part of this process, management server 101 can first identify which on-premise servers are associated with entity 1's account as shown in step 2. As described above, management server 101 will identify that on-premise servers 102a and 102b are associated with entity 1's account while on-premise servers 402 and 412 (and possibly many other on-premise servers) are not. Accordingly, in step 3, management server 101 can send registration request 301 to on-premise servers 102a and 102b to commence the process shown in FIGS. 3A-3D. As a result, any devices on the same subnet as on-premise server 102a or on the same subnet as on-premise server 102b will receive a registration packet 301a containing the information provided in registration request 301 and will therefore automatically request registration with management server 101. In this way, entity 1's administrator can cause all entity 1's devices to be discovered without needing to manually configure any of the devices to do so.

Figure 5:
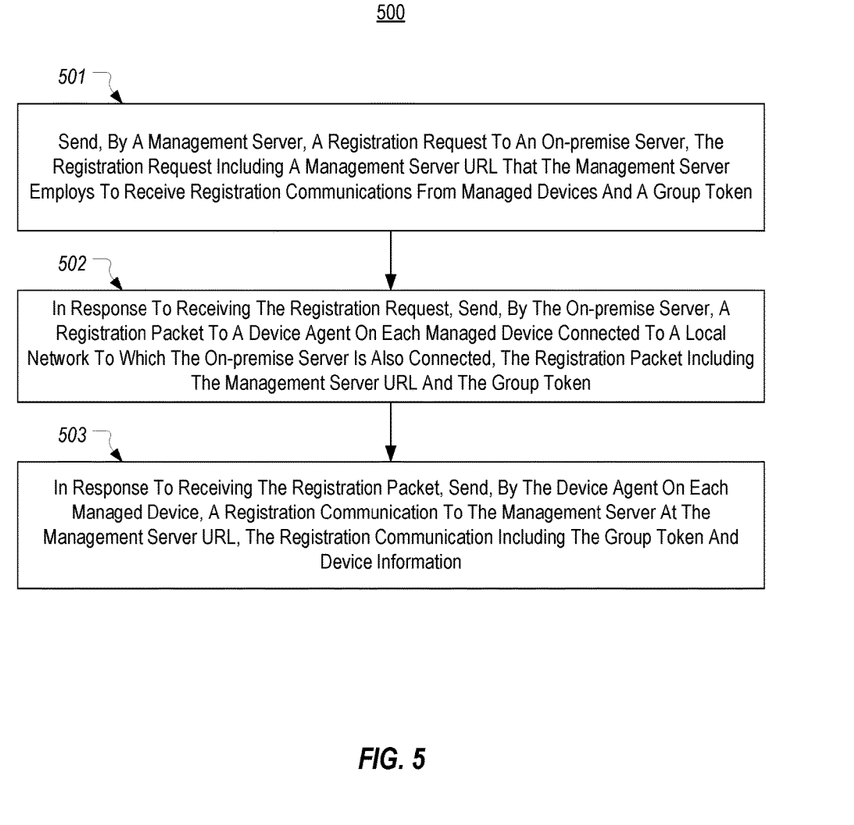
FIG. 5 illustrates a flowchart of an example method for manually discovering managed devices from a management server.

FIG. 5 illustrates a flowchart of an example method 500 for manually discovering managed devices from a management server. As an example, method 500 can be performed by management server 101, on-premise server 102, and device agent(s) 110.

Method 500 includes an act 501 of sending, by a management server, a registration request to an on-premise server, the registration request including a management server URL that the management server employs to receive registration communications from managed devices and a group token. For example, management server 101 can send registration request 301 to on-premise server 102.

Method 500 includes an act 502 of, in response to receiving the registration request, sending, by the on-premise server, a registration packet to a device agent on each managed device connected to a local network to which the on-premise server is also connected, the registration packet including the management server URL and the group token. For example, on-premise server 102 can broadcast registration packet 301a on local network 120.

Method 500 includes an act 503 of, in response to receiving the registration packet, sending, by the device agent on each managed device, a registration communication to the management server at the management server URL, the registration communication including the group token and device information. For example, device agent 110 on managed devices 103a-103n can send registration communications 302a-302n respectively.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method implemented in a device management environment for manually discovering managed devices from a management server, the method comprising:
    sending, by the management server, a registration request to an on-premise server, the registration request including a management server URL that the management server employs to receive registration communications from managed devices and a group token;
    in response to receiving the registration request, sending, by the on-premise server, a registration packet to a device agent on each managed device connected to a local network to which the on-premise server is also connected, the registration packet including the management server URL and the group token; and
    in response to receiving the registration packet, sending, by the device agent on each managed device, a registration communication to the management server at the management server URL, the registration communication including the group token and device information such that the management server discovers each managed device by virtue of receiving, at the management server URL and from each managed device, the registration communication that includes the group token and the corresponding managed device's device information.

2. The method of claim 1, wherein the management server is a cloud based server that communicates with the on-premise server and the device agents via the internet.

3. The method of claim 1, further comprising:
in response to receiving the registration communication from each device agent, validating the group token and sending an authorization code to the device agent.

4. The method of claim 3, wherein the registration request and the registration packet also include a notification server URL that a notification server employs to receive registration communications from managed devices, the method further comprising:
sending, by each device agent, a registration communication to the notification server at the notification URL, the registration communication including the authorization code.

5. The method of claim 4, wherein the registration communication sent to the notification server also includes device information.

6. The method of claim 1, wherein sending, by the on-premise server, the registration packet to the device agent on each managed device connected to the local network to which the on-premise server is also connected comprises broadcasting or multicasting the registration packet on a subnet to which the on-premise server is connected.

7. The method of claim 1, wherein the management server sends the registration request in response to input received from an administrator.

8. The method of claim 7, wherein the on-premise server is one of many on-premise servers that are registered with the management server, the on-premise server being associated with the administrator, the method further comprising:
determining, by the management server, that the on-premise server is associated with the administrator; and
sending the registration request to the on-premise server, but not to other on-premise servers that are not associated with the administrator.

9. The method of 8, further comprising:
determining, by the management server, that at least one other on-premise server is associated with the administrator; and
sending the registration request to the at least one other on-premise server.

10. The method of claim 1, wherein the registration packet specifies a type of managed device, and wherein the device agent on managed devices of the specified type sends the registration communication while the device agent on managed devices that are not of the specified type do not send the registration communication.

11. A device management platform comprising:
a management server that executes in the cloud;
an on-premise server that is connected to a local network; and
a device agent configured to be installed on devices that are connected to the local network;
wherein the management server is configured to send a registration request to the on-premise server, the registration request including a management server URL that the management server employs to receive registration communications from managed devices and a group token;

wherein, in response to receiving the registration request, the on-premise server is configured to send a registration packet to the device agent on each managed device connected to the local network, the registration packet including the management server URL and the group token; and
wherein, in response to receiving the registration packet, the device agent is configured to send a registration communication to the management server at the management server URL, the registration communication including the group token and device information such that the management server discovers each managed device by virtue of receiving, at the management server URL and from each managed device, the registration communication that includes the group token and the corresponding managed device's device information.

12. The device management platform of claim 11, wherein, in response to receiving the registration communication from each device agent, the management server is further configured to validate the group token and send an authorization code to the device agent.

13. The device management platform of claim 12, further comprising:
a notification server;
wherein the registration request and the registration packet also include a notification server URL that the notification server employs to receive registration communications from managed devices;
wherein the device agent is further configured to send a registration communication to the notification server at the notification URL, the registration communication including the authorization code.

14. The device management platform of claim 11, wherein the on-premise server is configured to broadcast or multicast the registration packet.

15. The device management platform of claim 11, wherein the management server is configured to send the registration request to the on-premise server in response to input from an administrator with which the on-premise server is associated.

16. The device management platform of claim 14, wherein the management server is further configured to send the registration request to at least one other on-premise server that is associated with the administrator.

17. One or more computer storage media storing computer executable instructions which when executed by one or more processors implement a method for manually discovering managed devices from a management server, the method comprising:
sending, by the management server, a registration request to an on-premise server, the registration request including a management server URL that the management server employs to receive registration communications from managed devices, a group token, and a notification server URL that a notification server employs to receive registration communications from managed devices;
in response to receiving the registration request, sending, by the on-premise server, a registration packet to a device agent on each managed device connected to a network to which the on-premise server is also connected, the registration packet including the management server URL, the group token, and the notification server URL; and
in response to receiving the registration packet, sending, by the device agent on each managed device, a registration communication to the management server at the management server URL, the registration communication including the group token and device information such that the management server discovers each managed device by virtue of receiving, at the management server URL and from each managed device, the registration communication that includes the group token and the corresponding managed device's device information.

18. The computer storage media of claim 17, wherein the management server executes in the cloud as Software as a Service.

19. The computer storage media of claim 17, wherein the method further comprises:
   in response to receiving the registration communication from each device agent, validating the group token and sending an authorization code to the device agent; and
   sending, by each device agent, a registration communication to the notification server at the notification URL, the registration communication including the authorization code.

20. The computer storage media of claim 17, wherein the on-premise server broadcasts or multicasts the registration packet.

* * * * *